US006535351B1

(12) United States Patent
Yip et al.

(10) Patent No.: US 6,535,351 B1
(45) Date of Patent: Mar. 18, 2003

(54) NARROW TRACK RESOLUTION MAGNETO-OPTIC READ HEAD

(75) Inventors: Yung Yip, Afton, MN (US); Daniel P. Stubbs, Marine on St. Croix, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/992,175

(22) Filed: Nov. 14, 2001

(51) Int. Cl.[7] .................................................. G11B 5/33
(52) U.S. Cl. .................................................. 360/114.01
(58) Field of Search .................. 360/114.01, 114.05, 360/114.08, 110

(56) References Cited

U.S. PATENT DOCUMENTS

| | | | | |
|---|---|---|---|---|
| 3,465,322 A | * | 9/1969 | Stapper, Jr. | 360/114.05 |
| 5,689,391 A | | 11/1997 | Maurice | 360/114.08 |
| 5,917,671 A | * | 6/1999 | Kaaden et al. | 360/77.12 |
| 6,084,848 A | * | 7/2000 | Goto | 369/121 |
| 6,151,192 A | | 11/2000 | Maurice | 369/13.32 |

OTHER PUBLICATIONS

Maillot et al., "High track density magneto–optical readout of magnetic tapes," *IEEE Transactions on Magnetics*, vol. 30, No. 2, Mar. 1994, pp. 326–330.

* cited by examiner

*Primary Examiner*—Robert S. Tupper
*Assistant Examiner*—Julie Anne Watko

(57) ABSTRACT

In one embodiment, the invention is directed toward a magneto-optic read head formed to suppress magnetic exchange coupling at regular intervals along a lateral direction of the read head. For example, in the region of the magneto-optic read head where light is reflected, i.e., the optical scanning region, the read head may be formed with a series of ferromagnetic exchange breaks that reduce lateral permeability of magnetic fields, and hence reduce lateral flux through the read head. In this manner, the effective resolution of the read head can be increased, thereby facilitating readout of data stored on narrower data tracks.

18 Claims, 6 Drawing Sheets

NARROW TRACK RESOLUTION MAGNETO-OPTIC READ HEAD

TECHNICAL FIELD

The invention relates to magnetic data storage and, in particular, magneto-optic read heads for magnetic media.

BACKGROUND

Magnetic storage media, which include magnetic tape and magnetic disks, are commonly used for storage and retrieval of data. The data is typically encoded in magnetizations on the recording surface of the magnetic media. A typical magnetic recording medium includes a thin layer of ferromagnetic material, such as gamma ferric oxide, supported by a non-magnetic substrate. The ferromagnetic material is a material that can be permanently magnetized by the application of an external magnetic field. The ferromagnetic material typically includes magnetic particles mixed with a binder material that can attach to the non-magnetic substrate. The ferromagnetic material is typically applied to the non-magnetic substrate in a coating process. Alternatively, metal evaporation techniques or sputtering techniques can be used to apply the ferromagnetic material on the non-magnetic substrate.

Magneto-optic read techniques have been developed for readout of data stored on magnetic media. Magneto-optic read techniques take advantage of both electromagnetic principles and optics to facilitate data readout. A magneto-optic read head has a simple magnetic structure that includes two magnetic poles separated by a non-magnetic layer (gap). The read head can capture fringing magnetic fields produced by the magnetic particles that are encoded with data on the surface of the magnetic media. Light is reflected off one of the magnetic poles of the read head, typically near the edge of the pole, and detected by a light detector such as a linear charged coupled device (CCD). When the light is reflected, a polarization rotation occurs, sometimes referred to as the longitudinal Kerr effect. The polarization rotation is proportional to the pole magnetization in the read head. Thus, the polarization of the detected light can be interpreted to facilitate readout of the data magnetically encoded in the surface of the magnetic media.

Migration of magnetic tape technology to higher and higher recording densities require narrower track widths on the magnetic tape. Magneto-optic read heads can mitigate media dimensional instability and can improve track following capabilities to facilitate narrower track widths, and thus accommodate higher data storage densities on magnetic tape. However, magnetic cross-talk in the magneto-optic read head may limit track density. In other words, as data tracks on the magnetic media are spaced closer and closer together, the magnetic flux captured in the magneto-optic read head can overlap for adjacent tracks. This magnetic cross-talk can undermine the ability to effectively read the data stored on the magnetic media. For this reason, track width reduction presents a significant challenge to magneto-optic read head technologies.

SUMMARY

In general, the invention is directed toward a magneto-optic read head formed to suppress magnetic exchange coupling at regular intervals along a lateral direction of the read head. For example, in the region of the magneto-optic read head where light is reflected, i.e., the optical scanning region, the read head can be formed with a series of ferromagnetic exchange breaks that reduce lateral permeability of magnetic fields, and hence reduce lateral flux through the read head. In this manner, the effective resolution of the read head can be increased, thereby facilitating readout of data stored on narrower data tracks.

The inventive read head can significantly reduce magnetic cross-talk in the optical scanning region. The cross-talk can be reduced, for example, by forming the series of ferromagnetic exchange breaks that reduce lateral permeability in the optical scanning region. Thus, the magnetic flux associated with adjacent tracks does not substantially permeate across the ferromagnetic exchange breaks in the optical scanning region. In other words, the presence of ferromagnetic exchange breaks in the optical scanning region ensures that the magnetic fields for the data regions in one track do not corrupt the readout of data regions in adjacent tracks. In some embodiments, the ferromagnetic exchange breaks are defined by the absence of magnetic material, which can be etched away to define the ferromagnetic exchange breaks. In other embodiments, the ferromagnetic exchange breaks can be formed by doping lines through the magnetic material, for example, by using ion implantation methods.

The ferromagnetic exchange breaks may be formed only in the optical scanning region. The other regions of the magneto-optic read head, including the other regions on a magnetic film, may not include the ferromagnetic exchange breaks. Such a configuration can decrease the total reluctance through the read head, while also reducing cross-talk in the optical scanning region. Decreasing the reluctance through the read head, in turn, can improve the ability to read the data by increasing magnetic field strength throughout the read head.

The ferromagnetic exchange breaks may be spaced at intervals less than one-half of a track width associated with a recorded media to be read by the magneto-optic read head to effectively over-sample the data. This over-sampling can ensure that all of the relevant data is captured even if the read head moves laterally relative to the magnetic media. In particular, over-sampling ensures that all of the data is captured as long as the head is positioned somewhere over the data tracks. The captured data can then be resolved by signal processing algorithms or techniques. In particular, by spacing the ferromagnetic exchange breaks at intervals less than one-half of the track width, crosstalk can be reduced or eliminated. In that case, at least one flux guide, which separates the ferromagnetic exchange breaks, would be dedicated to each track.

In one embodiment, the invention is directed toward a magneto-optic read head. For example, the magneto-optic read head may include a first magnetic layer and a second magnetic layer separated by a non-magnetic layer. The first magnetic layer may be a magnetic film that includes an optical scanning region formed with a series of ferromagnetic exchange breaks. In some embodiments, the series of ferromagnetic exchange breaks are formed by etching or doping lines through the optical scanning region. The ferromagnetic exchange breaks can reduce lateral permeability of magnetic flux through the first magnetic layer. The series of ferromagnetic exchange breaks can be spaced at intervals less than one-half of a track width associated with a recorded medium to be read by the magneto-optic read head. The magneto-optic read head may include the ferromagnetic exchange breaks only in the optical scanning region.

In another embodiment, the invention may comprise a magneto-optic read system that includes the magneto-optic read head as described above. In addition, the system may include a light source that illuminates the optical scanning region of the read head, and a light detector that detects light reflected off the optical scanning region. For example, the reflected light can be detected and interpreted to facilitate data readout.

In other embodiments, the invention is directed toward one or more methods. For example, a method may include positioning a magneto-optic read head in proximity to a magnetic data storage medium. The magneto-optic read head may include one or more of the features outlined above. After positioning the read head, the optical scanning region of the read head can be illuminated. Light reflected by the optical scanning region can then be detected to facilitate data readout. In particular, light polarization may be detected, and then interpreted and used to generate a readout signal indicative of data stored on the magnetic data storage medium.

In still another embodiment, a method of creating a magneto-optic read head includes depositing a magnetic material to create a thick layer of magnetic material and depositing a non-magnetic material on the thick layer of magnetic material. The method may also include depositing a thin magnetic film on the non-magnetic material and then forming a series of ferromagnetic exchange breaks in the magnetic film, wherein the ferromagnetic exchange breaks reduce lateral permeability of magnetic flux through the magnetic film. The ferromagnetic exchange breaks may be spaced at intervals less than one-half of a track width associated with the recorded media to be read. In addition, the ferromagnetic exchange breaks may extend only as far as the optical scanning region so that total reluctance of the magneto-optic read head is increased as little as possible.

The invention is capable of providing a number of advantages. For example, magneto-optic read heads can read numerous data tracks simultaneously, e.g., over a thousand tracks may be read simultaneously. For this reason, magneto-optic read heads present an attractive alternative to conventional read heads. In addition, magneto-optic read heads may be able to read smaller sized data tracks than other conventional read heads. In particular, the inventive read head described in this disclosure can facilitate magneto-optic readout of magnetic data stored on magnetic tracks having widths smaller than one micron. Facilitating readout of data stored on magnetic tracks having widths smaller than one micron can enable higher data storage densities to be realized on magnetic tape.

Forming the magneto-optic read head with ferromagnetic exchange breaks to suppress magnetic exchange coupling at regular intervals provides additional advantages. For example, the ferromagnetic exchange breaks can reduce or eliminate cross-talk. Moreover, a reduction in cross-talk can improve the ability to read the data, and may facilitate the ability to read smaller sized data tracks than other conventional magneto-optic read heads. Importantly, as tracks become smaller, data storage densities on the magnetic media increases.

In particular, by spacing the ferromagnetic exchange breaks at intervals less than one-half of the track width, cross-talk can be reduced or eliminated. Spacing the ferromagnetic exchange breaks at intervals less than one-half of the track width results in over-sampling of the data. Cross-talk can be reduced or eliminated in this manner, because every track would have a dedicated flux guide separated by ferromagnetic exchange breaks. Moreover, the over-sampling can ensure that all of the relevant data is captured even if the read head moves laterally relative to the magnetic media. In addition, servo patterns may not be required.

Still additional advantages can be achieved by including the ferromagnetic exchange breaks only in the optical scanning region of the read head. As mentioned, a magnetic film may comprise the first magnetic layer, and a portion of the magnetic film may comprise the optical scanning region. Although the ferromagnetic exchange breaks are advantageous to reduce cross-talk, the ferromagnetic exchange breaks increase the reluctance path through the read head. For this reason, it is advantageous to extend the ferromagnetic exchange breaks only as far as necessary to achieve the desired reduction in cross-talk. By including the ferromagnetic exchange breaks only in the optical scanning region of the read head, cross talk can be reduced, and at the same time, the total reluctance through the magneto-optic read head can be minimized. For example, the magnetic film may be continuous and not etched or doped in the regions that do not correspond to the optical scanning region. In this manner, the total reluctance of the magneto-optic read head can be reduced, thereby increasing the magnetic flux through the read head.

Additional details of various embodiments are set forth in the accompanying drawings and the description below. Other features, objects, and advantages of the present invention will be apparent from the description and drawings, and from the claims.

DETAILED DESCRIPTION

Figure 1:
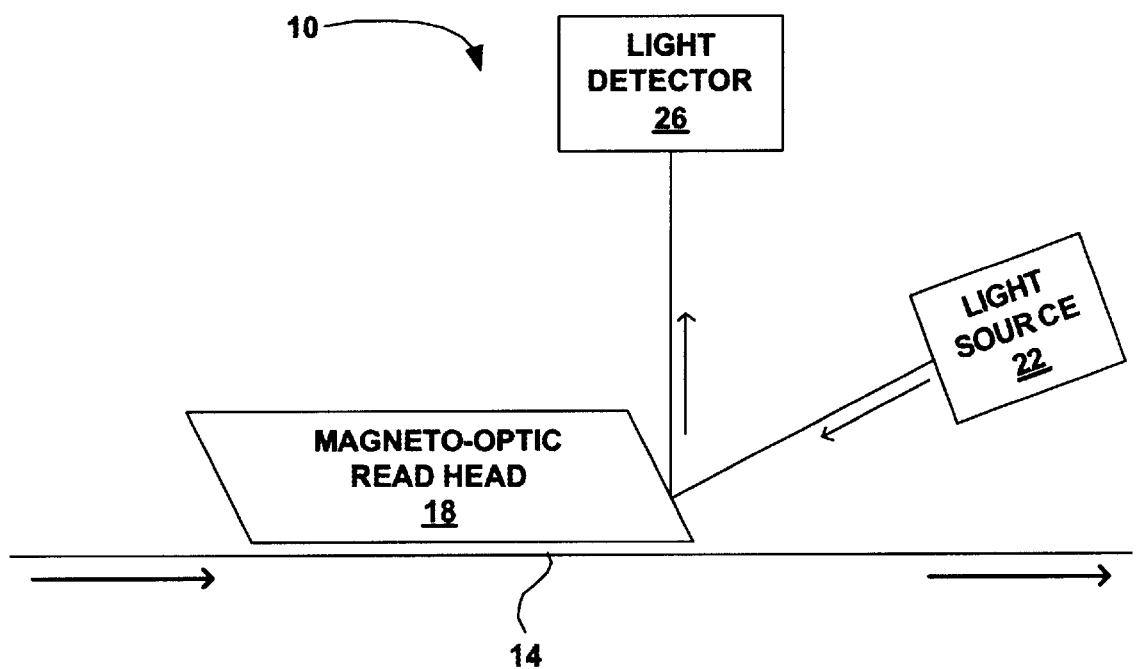
FIG. 1 is a block diagram of a magneto-optic read system according to the invention.

Various aspects of the invention are described in relation to readout of magnetic tape media. The same principles and advantages may be extended for use with other magnetic media, including magnetic disks and the like. FIG. 1 is a block diagram of a magneto-optic read system 10 according to the invention. As shown, magnetic tape 14 passes under magnetic read head 18 to facilitate readout of data stored on the magnetic tape 14.

Magnetic tape 14 typically includes a number of tracks, each of which has a series of magnetically encoded data regions. The data tracks run longitudinally, i.e., parallel to the direction that the tape feeds. Each magnetically encoded data region within the data tracks may correspond to a bit of information or a number of bits of information. The data regions may be magnetically recorded using one of a variety of different data recording techniques.

System 10 can be used to read data magnetically stored on magnetic tape 14. As tape 14 passes under magneto-optic read head 18, the head 18 captures fringing magnetic fields associated with the various data regions in a number of data tracks on magnetic tape 14. In other words, as tape 14 passes under magneto-optic read head 18, each of the data regions in a number of the data tracks likewise pass under magneto-optic read head 18. In some cases, all of the data tracks of magnetic tape 14 may simultaneously pass under magneto-optic read head 18.

System 10 can simultaneously read the data stored in data regions that are spaced transversely across tape 14. In other words, the data stored in each data track on tape 14 is read out at the same time as data stored in other data tracks. To facilitate readout, light source 22 illuminates an optical scanning region of magneto-optic read head 18 typically located near the edge of read head 18. Light reflects off read head 18 and is detected by light detector 26. For example, light detector 26 may comprise a linear CCD that detects the polarization of reflected light. Alternatively, light detector 26 may comprise a two-dimensional array charged coupled device, a charge injection device, a photomultiplier tube, a photodiode, a complementary metal oxide semiconductor (CMOS), and one or more other light detectors.

When the light from light source 22 is reflected off magneto-optic read head 18, a polarization rotation occurs, sometimes referred to as the longitudinal Kerr effect. The polarization rotation angle is proportional to the pole magnetization in magneto-optic read head 18. This polarization rotation angle can be detected for each data track in magnetic tape 14. The polarization of the light detected by light detector 26 can be interpreted to facilitate readout of the data magnetically encoded on the surface of the magnetic media. As described in greater detail below, magneto-optic read head 18 includes an optical scanning region formed with ferromagnetic exchange breaks to effectively reduce cross-talk between adjacent tracks. In other words, the ferromagnetic exchange breaks can ensure that fringing fields of data regions in adjacent tracks are distinguishable from one another, even when track widths are smaller than one micron.

Figure 2:
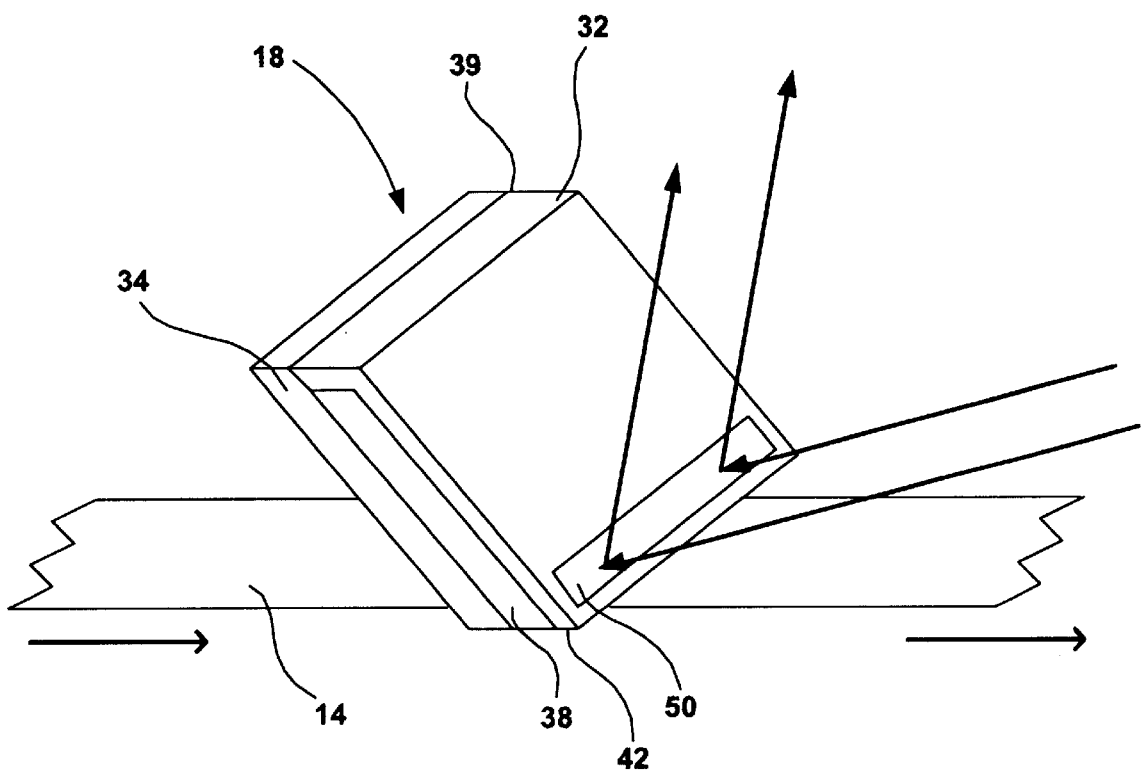
FIG. 2 is a perspective view illustrating magnetic tape passing under a magneto-optic read head.

FIG. 2 is a perspective view illustrating magnetic tape 14 passing under magneto-optic read head 18. As tape 14 passes under read head 18, fringing magnetic fields associated with data stored on tape 14 are captured by read head 18. Light is reflected off read head 18 and the polarization of the reflected light can be detected and interpreted to facilitate readout of data regions in the data tracks on tape 14.

Magneto-optic read head 18 includes a first magnetic layer 32 and a second magnetic layer 34 separated by a non-magnetic material 38. The first and second magnetic layers can form magnetic poles, enabling magneto-optic read head 18 to capture fringing magnetic fields associated with the data regions in data tracks on tape 14. Typically, the first and second magnetic layers 32 and 34 are magnetically coupled to one another to form the magnetic path through read head 18. For example, the first and second magnetic layers may be coupled to one another at a first end 39 and separated by non-magnetic layer 38 everywhere else.

Second magnetic layer 34 typically comprises a relatively thick layer of magnetic material with low reluctance. For example, second magnetic layer 34 may comprise an alloy with high iron content, such as pure iron or nitrated iron. Non-magnetic material 38 can be formed on second magnetic pole 34 to a desired thickness, typically between 500 and 30,000 angstroms. A relatively thin layer of magnetic material with low reluctance can then be deposited to realize first magnetic layer 32. For example, deposition of the first magnetic layer 32 can couple the first magnetic layer 32 to second magnetic layer 34 at first end 39. Thus, once read head 18 is completely formed, second magnetic layer 34 is magnetically coupled to first magnetic layer 32 at first end 39 and separated by non-magnetic material everywhere except first end 39.

First magnetic layer 32 (sometimes referred to as a Kerr Effect layer) typically has a relatively small thickness so as to be magnetized virtually to saturation by the fringing magnetic fields associated with data regions in data tracks on tape 14. This can improve the polarization rotation effect that facilitates data readout. Like second magnetic layer 34, first magnetic layer 32 typically comprises an alloy with high iron content. For example, the alloy can be sputtered on non-magnetic layer 38 to realize first magnetic layer 32.

First magnetic layer 32 includes optical scanning region 50. Optical scanning region 50 defines the region used to reflect incoming light to facilitate data readout. Optical scanning region 50 is typically located near an edge of magneto-optic read head 18 so that optical scanning region 50 can be positioned as close as possible to magnetic tape 14. For example, optical scanning region 50 may be located near a second end 42 of first magnetic layer 32. This can increase the flux through the optical scanning region 50, which can improve data readout.

Figure 3:
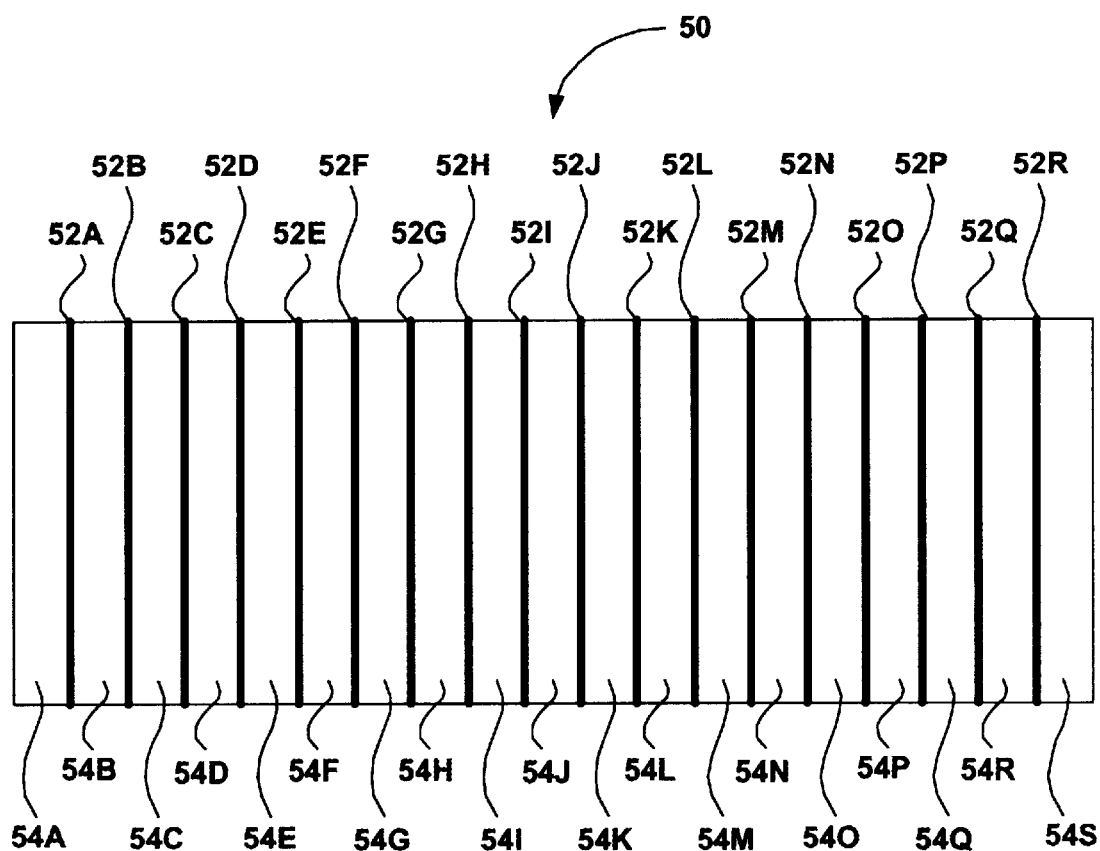
FIG. 3 is a close-up view of the optical scanning region of the first magnetic layer of a magneto-optic read head.

In accordance with the invention, first magnetic layer is formed with a series of ferromagnetic exchange breaks in optical scanning region 50. FIG. 3 is a close-up view of optical scanning region 50 of first magnetic layer 32. As shown, the thin magnetic material in optical scanning region 50 is formed with a series of ferromagnetic exchange breaks 52A–52R (hereafter ferromagnetic exchange breaks 52). The magnetic regions 54A–54S can be viewed as flux guides (hereafter flux guides 54) separated by the ferromagnetic exchange breaks 52.

Ferromagnetic exchange breaks 52 reduce lateral permeability of magnetic flux through the first magnetic layer 32. In other words, ferromagnetic exchange breaks 52 have a higher reluctance than flux guides 54. Thus, magnetic flux tends to permeate up through the flux guides 54 and tends to not permeate laterally through the ferromagnetic exchange breaks 52. If two adjacent flux guides, e.g., flux guide 54B and 54C, pass over two adjacent data tracks, the fringing field of a data region on the first track will permeate through one of the flux guides and the fringing field for a data region on the other track will permeate through the other flux guide. Ferromagnetic exchange break 52B reduces lateral permeability of magnetic flux, thus reducing cross-talk. In other words, ferromagnetic exchange break 52B ensures that the flux passing through flux guide 54B does not substantially permeate into flux guide 54C, and vice versa.

Figure 4:
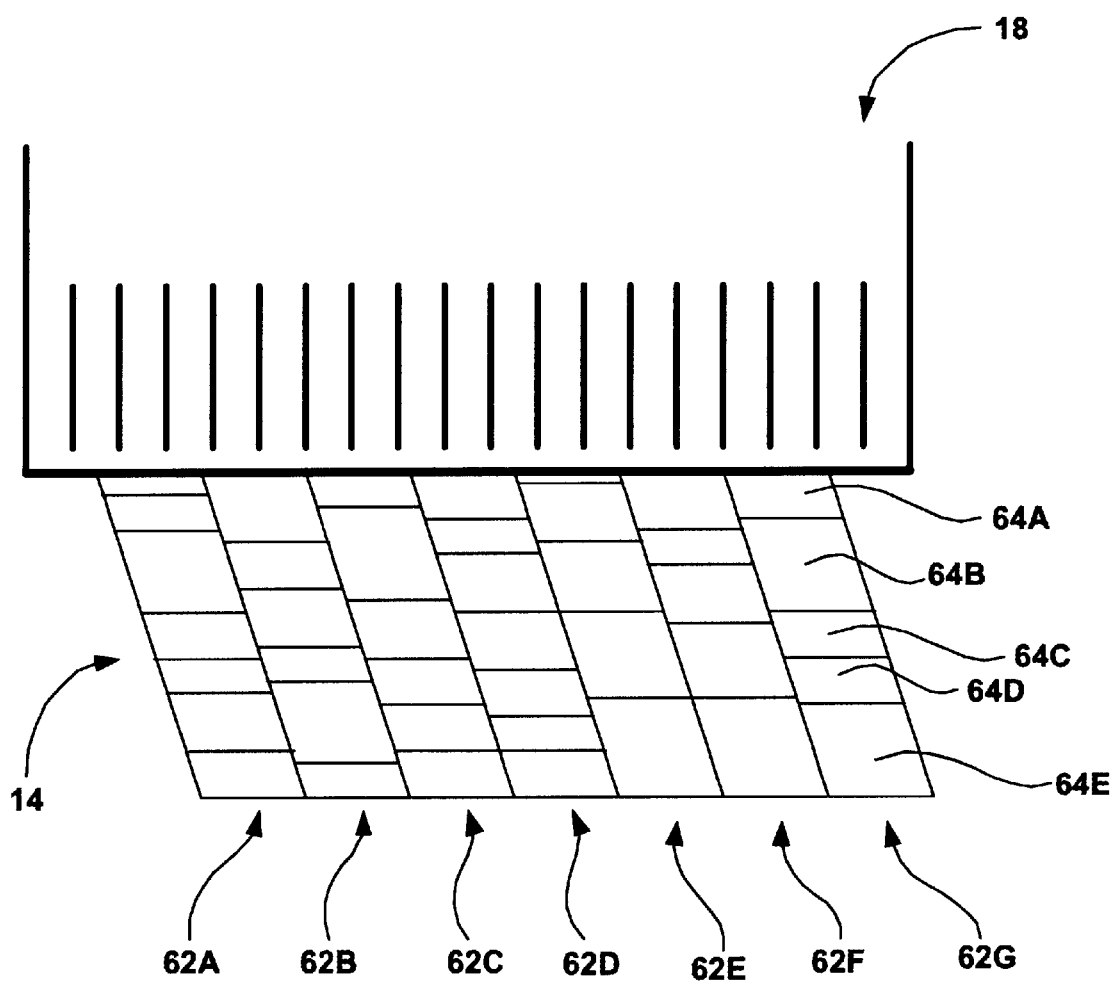
FIG. 4 is a front view of a portion of a magneto-optic read head, with magnetic tape passing under the head.

FIG. 4 is a front view of a portion of magneto-optic read head 18, with magnetic tape 14 passing under head 18. As shown, magnetic tape 14 includes a number of data tracks 62A–62G. Each data track 62 includes a number of data regions (only data regions 64A–64E of data track 62G are labeled). The fringing magnetic fields of the data regions are captured by magneto-optic read head 18 as tape 14 passes under magneto-optic read head 18. The fringing fields of the data regions, however are constrained by ferromagnetic exchange breaks 52, and thus, the flux tends to follow flux guides 54 as it passes through optical scanning region 50 of read head 18. In this manner, flux passing through optical scanning region 50 can be more effectively distinguished between flux guides 54, reducing cross-talk and thereby improving data readout.

The series of ferromagnetic exchange breaks 52 can be spaced at intervals less than one-half of a track width associated with magnetic tape 14. In other words, each flux guide 54 can have a width that is one half, or less than one half, of the width of the data tracks 62. Spacing the ferromagnetic exchange breaks at intervals less than one-half of a track width is highly advantageous because it can significantly improve lateral track resolution of read head 18.

Spacing the ferromagnetic exchange breaks at intervals less than one-half of the track width results in over-sampling of the data in accordance with the "Nyquist Sampling Theorem." In some embodiments, the ferromagnetic exchange breaks are spaced at even smaller intervals relative to the track width to provide improved resolution. In general, the over-sampling can ensure that all of the relevant data is captured even if the read head moves laterally relative to the magnetic media. Moreover, this over-sampling can reduce or eliminate cross-talk by ensuring that at least one flux guide is solely dedicated to each track. All of the data can be captured as long as the head is positioned somewhere over the data tracks. The captured data can then be resolved by signal processing algorithms or techniques.

Spacing the ferromagnetic exchange breaks at intervals less than one-half of the track width can also facilitate the ability to use the same magneto-optic read head for read out of data on different magnetic tape. For example, the ferromagnetic exchange breaks may be spaced at intervals less than one-half of the track width associated with the tape having the narrowest track width. Other tapes having track widths wider than the narrowest track width could also be read using the same read head. In that case, the wider track widths would be sampled at higher resolution by the same magneto-optic read head.

Referring again to FIG. 2, the ferromagnetic exchange breaks may be formed only in optical scanning region 50. Although the ferromagnetic exchange breaks are advantageous to reduce cross-talk, the ferromagnetic exchange breaks also increase the reluctance path through the read head. For this reason, it is advantageous to extend the ferromagnetic exchange breaks only as far as necessary to achieve the desired reduction in cross-talk. By including the ferromagnetic exchange breaks only in optical scanning region 50 of magneto-optic read head 18, cross-talk can be reduced, and at the same time the total reluctance through the magneto-optic read head can be minimized. For example, the magnetic film may be continuous in the regions that do not correspond to optical scanning region 50. In this manner, the total reluctance of magneto-optic read head 18 can be reduced, thereby increasing the magnetic flux through read head 18 as magnetic tape 14 passes under it.

Ferromagnetic exchange breaks 52 and corresponding flux guides 54 can be created in a variety of ways. In one case, flux guides 54 comprise magnetic material while ferromagnetic exchange breaks 52 are defined by the absence of magnetic material. For example, first magnetic layer 32 could be fabricated to include flux guides 54. In that case, ferromagnetic exchange breaks 52 would be defined simply by the absence of magnetic material between the flux guides 54.

Fabrication of magneto-optic read head 18, however, can be greatly simplified if ferromagnetic exchange breaks 52 comprise etched regions or doped regions within optical scanning region 50 on first magnetic layer 32. For example, if first magnetic layer 32 is a thin film of magnetic material, ferromagnetic exchange breaks 52 may be formed simply by etching or doping lines through the optical scanning region. In this manner, the lateral permeability of magnetic flux through first magnetic layer 32 can be reduced, specifically at the ferromagnetic exchange breaks in optical scanning region 50, to improve data readout.

In one embodiment, ferromagnetic exchange breaks 52 comprise etched lines through a magnetic film that comprises first magnetic layer 32. In other words, the magnetic material that makes up the magnetic film can be etched away to realize ferromagnetic exchange breaks 52. For example, the etched lines can be created using various Focused Ion Beam (FIB) methods. The etched lines may have widths on the order of 5–100 nanometers to effectively reduce lateral flux permeability, while minimizing the increase in total reluctance through magneto-optic read head 18.

In an alternative embodiment, ferromagnetic exchange breaks 52 comprise doped regions that separate flux guides 54. In particular, if first magnetic layer 32 comprises a magnetic film, ferromagnetic exchange breaks 52 can be created by doping small lines in the magnetic film. For example, the magnetic film can be doped with a material such as gallium, aluminum or copper using scanning ion implantation methods to realize ferromagnetic exchange breaks 52. The doped lines may have widths on the order of 5–100 nanometers to effectively reduce lateral flux permeability, while minimizing the increase in total reluctance through magneto-optic read head 18.

Figure 5:
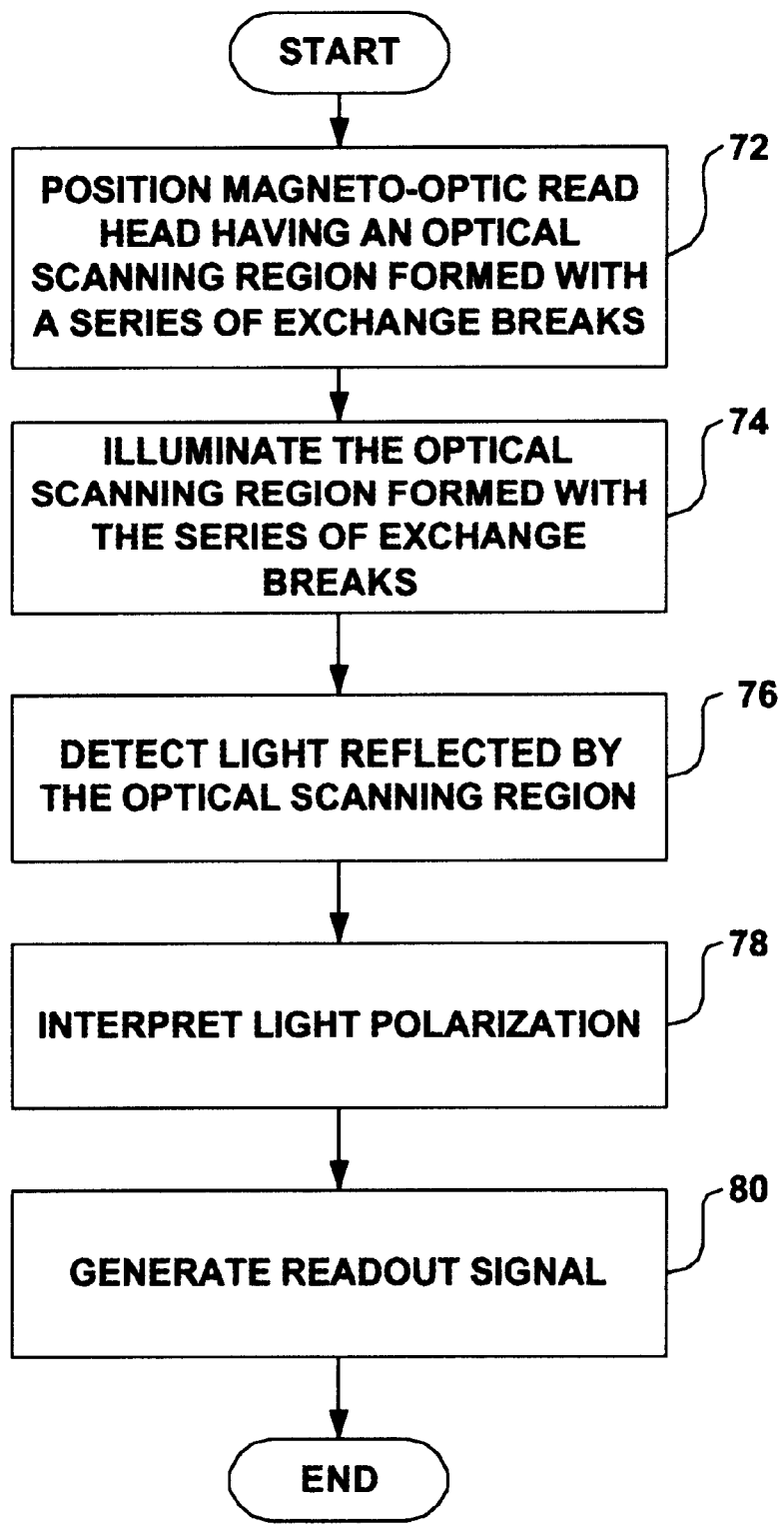
FIG. 5 is a flow diagram illustrating the operation of a magneto-optic read system according to the invention.

FIG. 5 is a flow diagram illustrating the operation of a magneto-optic read system 10 according to the invention. As shown, a magneto-optic read head 18 formed with a series of ferromagnetic exchange breaks is positioned over a magnetic medium, such as magnetic tape 14 (72). In particular, the ferromagnetic exchange breaks may be formed only in an optical scanning region 50 of magneto-optic read head 18 and may be spaced at intervals less than one-half of a track width associated with the recorded medium. Light source 22 illuminates optical scanning region 50 and reflects off of the optical scanning region (74). The reflected light is detected by light detector 26 (76). In particular, light detector 26 detects the polarization of the reflected light. The detected polarization of the reflected light can then be interpreted by a digital signal processor (DSP) (not shown) to provide an indication of the data stored on the magnetic medium (78). The DSP can then generate a readout signal accordingly (80).

Figure 6:
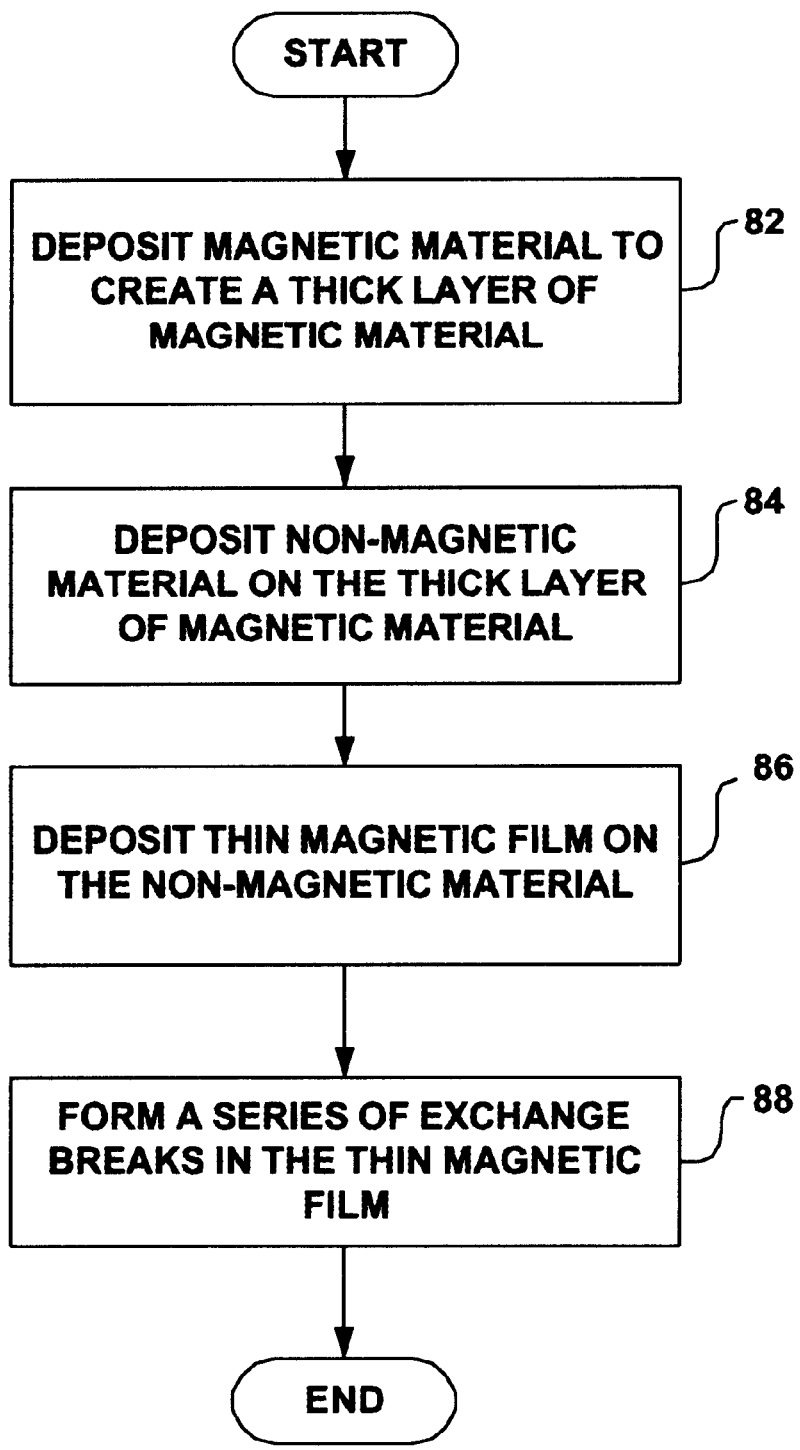
FIG. 6 is a flow diagram illustrating a process by which one embodiment of the inventive magneto-optic read head can be fabricated.

FIG. 6 is a flow diagram illustrating a process by which an embodiment of the inventive magneto-optic read head 18 can be fabricated. As shown, magnetic material is deposited to create a thick layer of magnetic material, i.e., second layer of magnetic material 34 (82). For example, the magnetic material may comprise an alloy with high iron content and may be deposited to a thickness between 500 and 30,000 angstroms, although the invention is not limited in that respect. A non-magnetic material, such as a material having a very high reluctance is then deposited onto the thick layer of magnetic material to realize non-magnetic layer 38 (84). The deposited non-magnetic material may have a thickness between 500 and 30,000 angstroms, although the invention is not limited in that respect.

A thin magnetic film can then be deposited on the non-magnetic material to realize first layer of magnetic material 32 (86). For example, the thin magnetic film may have a thickness between 100 and 2000 angstroms, although the invention is not limited in that respect. Deposition of the thin magnetic film can magnetically couple the film to second magnetic layer 34 to form the magnetic path through read head 18. Like the thick layer of magnetic material, the thin magnetic film may comprise an alloy with high iron content. After the deposition of the various materials is complete, the thick layer of magnetic material is coupled to the thin magnetic film at a first end and separated by the non-magnetic material everywhere except the first end.

After depositing the thin magnetic film, a series of ferromagnetic exchange breaks can be formed in the thin magnetic film (88). In particular, the ferromagnetic exchange breaks can be formed only in an optical scanning region on the thin magnetic film to minimize reluctance through the magneto-optic read head. Moreover, the series of ferromagnetic exchange breaks can be spaced at intervals less than one-half of a track width associated with a recorded medium to be read by the magneto-optic read head. This can improve resolution of the magneto-optic read head and help reduce or eliminate cross-talk.

The ferromagnetic exchange breaks can be formed in the magnetic film by etching or doping the magnetic film. For example, the ferromagnetic exchange breaks can be etched into the magnetic film using various FIB methods. Alternatively, the ferromagnetic exchange breaks can be doped into the magnetic film via scanning ion implantation methods using a doping material such as gallium, aluminum or copper. Any other method which can laterally suppress magnetic exchange coupling between adjacent flux guides could also be used.

A number of embodiments of the invention have been described. For example, a magneto-optic read head has been described which can significantly reduce cross-talk and enable readout of data on smaller data tracks than conventional read heads. In particular, the inventive read head described in this disclosure can facilitate magneto-optic readout of magnetic data stored on magnetic tracks having widths smaller than one micron.

Nevertheless, various modifications may be made to various aspects of this disclosure without departing from the scope of the invention. For example, the various layers of the read head may have any thickness. In addition, the flux guides and ferromagnetic exchange breaks need not be created from the same original thin magnetic film. Rather, the flux guides could be originally fabricated as such, with the ferromagnetic exchange breaks being defined by the absence of magnetic material between adjacent flux guides. In other embodiments, a magneto-optic read head having a loop configuration rather than a layered configuration may include the optical scanning region formed with a series of ferromagnetic exchange breaks as described herein. In still other embodiments, the invention may be implemented in a magnetic film that comprises the read head, possibly without any additional layers. Accordingly, other embodiments are within the scope of the following claims.

What is claimed is:

1. A magneto-optic read head comprising:
   a first magnetic layer;
   a second magnetic layer magnetically coupled to the first magnetic layer at a first end; and
   a non-magnetic material that separates the first and second magnetic layers everywhere except the first end, wherein the first magnetic layer includes an optical scanning region formed with a series of ferromagnetic exchange breaks that reduce lateral permeability of magnetic flux through the first magnetic layer, wherein the series of ferromagnetic exchange breaks are spaced at intervals less than one-half of a track width associated with a recorded medium to be read by the magneto-optic read head.

2. The magneto-optic read head of claim 1, wherein the first magnetic layer is a magnetic film.

3. The magneto-optic read head of claim 2, wherein the magnetic film is a sputtered magnetic film.

4. The magneto-optic read head of claim 2, wherein the series of ferromagnetic exchange breaks comprise etched lines in the magnetic film.

5. The magneto-optic read head of claim 2, wherein the series of ferromagnetic exchange breaks comprise doped lines within the magnetic film.

6. The magneto-optic read head of claim 2, wherein each ferromagnetic exchange break has a lateral dimension on the order of 5 to 100 nanometers.

7. The magneto-optic read head of claim 1, wherein the series of ferromagnetic exchange breaks are only in the optical scanning region.

8. The magneto-optic read head of claim 1, wherein the regions between the ferromagnetic exchange breaks comprise flux guides.

9. The magneto-optic read head of claim 1, wherein the read head can facilitate magneto-optic read of magnetic data stored on magnetic tracks having widths smaller than one micron.

10. A method comprising:
    positioning a magneto-optic read head in proximity to a magnetic data storage medium, the magneto-optic read head including an optical scanning region formed with a series of ferromagnetic exchange breaks that reduce lateral permeability of magnetic flux, wherein the series of ferromagnetic exchange breaks are spaced at intervals less than one-half of a track width associated with a recorded medium to be read by the magneto-optic read head;
    illuminating the optical scanning region; and
    detecting light reflected by the optical scanning region.

11. The method of claim 10, wherein detecting light comprises detecting light polarization, the method further comprising interpreting the light polarization to generate a read signal indicative of data stored on the magnetic data storage medium.

12. The method of claim 11, wherein the data stored on the magnetic data storage medium is stored in data tracks having track widths less than one micron.

13. A magneto-optic readout system comprising:
    a magneto-optic read head including a first magnetic layer, a second magnetic layer magnetically coupled to the first magnetic layer at a first end, and a non-magnetic layer that separates the first and second magnetic layers everywhere except the first end, wherein the first magnetic layer includes an optical scanning region formed with a series of ferromagnetic exchange breaks that reduce lateral permeability of magnetic flux through the first magnetic layer, and wherein the series of ferromagnetic exchange breaks are spaced at intervals less than one-half of a track width associated with a recorded medium to be read by the magneto-optic read head,
    a light source that illuminates the optical scanning region, and
    a light detector that detects light reflected off the optical scanning region.

14. The system of claim 13, wherein the series of ferromagnetic exchange breaks are formed only in the optical scanning region.

15. A magneto-optic read head including an optical scanning region formed with a series of ferromagnetic exchange breaks that reduce lateral permeability of magnetic flux through the optical scanning region, wherein the series of ferromagnetic exchange breaks are spaced at intervals less than one-half of a track width associated with a recorded medium to be read by the magneto-optic read head.

16. The magneto-optic read head of claim 15, wherein the head has a loop configuration, wherein the loop defines a magnetic path through the magneto-optic read head.

17. The magneto-optic read head of claim 15, wherein the head has a layered configuration wherein a first magnetic layer and a second magnetic layer are separated by a non-magnetic layer everywhere except a first end, and wherein the first and second magnetic layers define a magnetic path through the magneto-optic read head.

18. The magneto-optic read head of claim 15, wherein the head comprises a single magnetic film without any additional layers.

* * * * *